(12) United States Patent
Lowe (10) Patent No.: US 12,554,958 B2
(45) Date of Patent: Feb. 17, 2026

(54) METAL CARD WITH BIOMETRIC FEATURES

(71) Applicant: CompoSecure, LLC, Somerset, NJ (US)

(72) Inventor: Adam Lowe, Somerset, NJ (US)

(73) Assignee: CompoSecure, LLC, Somerset, NJ (US)

( * ) Notice: Subject to any disclaimer, the term of this patent is extended or adjusted under 35 U.S.C. 154(b) by 0 days.

(21) Appl. No.: 17/766,805

(22) PCT Filed: Oct. 22, 2020

(86) PCT No.: PCT/US2020/056814
§ 371 (c)(1),
(2) Date: Apr. 6, 2022

(87) PCT Pub. No.: WO2021/081175
PCT Pub. Date: Apr. 29, 2021

(65) Prior Publication Data
US 2024/0070425 A1    Feb. 29, 2024

Related U.S. Application Data

(60) Provisional application No. 62/925,926, filed on Oct. 25, 2019.

(51) Int. Cl.
*G06K 19/07*    (2006.01)
*B32B 15/04*    (2006.01)
(Continued)

(52) U.S. Cl.
CPC .......... *G06K 19/0718* (2013.01); *B32B 15/04* (2013.01); *G06K 19/0723* (2013.01);
(Continued)

(58) Field of Classification Search
CPC .......... G06K 19/0718; G06K 19/0723; G06K 19/07722; G06K 19/10; G06K 19/07743;
(Continued)

(56) References Cited

U.S. PATENT DOCUMENTS 9,290,366 B2    3/2016    Jones et al.
10,055,664 B2 *    8/2018    Vogel .................... G06V 10/147
(Continued)

FOREIGN PATENT DOCUMENTS

CN    108351712 A    7/2018
CN    110168567 A    8/2019
(Continued)

OTHER PUBLICATIONS

International Preliminary Report on Patentability and Written Opinion for International Application No. PCT/US2020/056814, issued Apr. 26, 2022, 10 pages.

(Continued)

*Primary Examiner* — Thien M Le
*Assistant Examiner* — Asifa Habib
(74) *Attorney, Agent, or Firm* — Buchanan Ingersoll & Rooney PC (57) ABSTRACT

Metal transaction cards and methods of making metal transaction cards are disclosed. One metal transaction card includes at least one metal layer and an inlay layer comprising a biometric sensor and one or more payment interface components configured to interface with a card reader, a secure element configured to exchange information with the card reader pursuant to processing a financial transaction, and at least one logic component connected to the biometric sensor. The logic component is configured to compare information detected by the biometric sensor to (Continued)

stored information and to enable processing of the financial transaction only upon a detected match between the detected and stored information.

34 Claims, 4 Drawing Sheets

(51) Int. Cl.
*G06K 19/077* (2006.01)
*G06Q 20/40* (2012.01)
*G06V 40/12* (2022.01)
*G06V 40/13* (2022.01)

(52) U.S. Cl.
CPC . *G06K 19/07722* (2013.01); *G06Q 20/40145* (2013.01); *G06V 40/1306* (2022.01); *G06V 40/1365* (2022.01); *B32B 2425/00* (2013.01)

(58) Field of Classification Search
CPC ............... B32B 15/04; B32B 2425/00; G06Q 20/40145; G06V 40/1306; G06V 40/1365
See application file for complete search history.

(56) References Cited

U.S. PATENT DOCUMENTS

| | | | |
|---|---|---|---|
| 10,406,734 B2 | 9/2019 | Lowe | |
| 10,891,459 B2* | 1/2021 | Lundahl | H01L 23/49855 |
| 11,392,189 B1* | 7/2022 | Scruggs | H01Q 7/00 |
| 2006/0047971 A1* | 3/2006 | Miyazaki | G06V 40/1306 |
| | | | 713/186 |
| 2006/0213973 A1 | 9/2006 | Chan et al. | |
| 2009/0145972 A1 | 6/2009 | Evans | |
| 2009/0322477 A1* | 12/2009 | Celorio | G07C 9/257 |
| | | | 340/5.82 |
| 2013/0036463 A1 | 2/2013 | Shashidhar | |
| 2014/0337243 A1* | 11/2014 | Dutt | G06Q 20/327 |
| | | | 705/325 |
| 2015/0339564 A1 | 11/2015 | Herslow et al. | |
| 2016/0188916 A1* | 6/2016 | Amarnath | G06K 19/07722 |
| | | | 235/449 |
| 2016/0224879 A1* | 8/2016 | Amarnath | G06F 3/0689 |
| 2016/0314334 A1* | 10/2016 | He | G06V 40/1318 |
| 2017/0213097 A1* | 7/2017 | Vogel | G06V 10/147 |
| 2017/0316300 A1 | 11/2017 | Herslow et al. | |
| 2018/0116572 A1* | 5/2018 | Simpson | A61B 5/683 |
| 2018/0207903 A1 | 7/2018 | Lowe | |
| 2018/0219680 A1 | 8/2018 | Kamal et al. | |
| 2018/0339503 A1 | 11/2018 | Finn et al. | |
| 2018/0357457 A1 | 12/2018 | Rasmussen et al. | |
| 2019/0019072 A1* | 1/2019 | Bertiaux | G06K 19/07701 |
| 2019/0050623 A1* | 2/2019 | Lavin | G06V 40/1394 |
| 2019/0073578 A1* | 3/2019 | Lowe | G06K 19/07722 |
| 2019/0080127 A1 | 3/2019 | Yoshida | |
| 2019/0172875 A1* | 6/2019 | Kang | H10K 59/126 |
| 2019/0197384 A1 | 6/2019 | Pachler | |
| 2019/0236434 A1 | 8/2019 | Lowe | |
| 2019/0244210 A1 | 8/2019 | Cheng | |
| 2019/0286805 A1* | 9/2019 | Law | G06F 21/34 |
| 2019/0354825 A1 | 11/2019 | Lowe | |
| 2019/0392436 A1* | 12/2019 | Lee | G06V 40/1306 |
| 2020/0125911 A1* | 4/2020 | Scruggs | G06Q 20/341 |
| 2020/0160025 A1* | 5/2020 | Dangy-Caye | G06F 21/32 |
| 2020/0311509 A1* | 10/2020 | Benkley, III | G06F 21/32 |
| 2020/0327458 A1* | 10/2020 | Dutt | G06Q 20/306 |
| 2020/0364527 A1* | 11/2020 | Coleman | G06K 19/07722 |
| 2021/0150175 A1* | 5/2021 | Lundberg | G06V 40/1306 |
| 2022/0051064 A1 | 2/2022 | Lowe | |
| 2022/0269918 A1* | 8/2022 | Su | G06V 40/1306 |
| 2023/0259734 A1* | 8/2023 | Katano | B42D 25/23 |
| | | | 235/492 |
| 2023/0342444 A1* | 10/2023 | Hammersberg | H10F 39/184 |
| 2023/0394269 A1* | 12/2023 | Lin | G06Q 20/341 |
| 2024/0086512 A1* | 3/2024 | Kim | H04N 23/683 |
| 2024/0119132 A1* | 4/2024 | Wieker | G06V 40/1365 |
| 2025/0165093 A1* | 5/2025 | Seo | G06F 3/04164 |

FOREIGN PATENT DOCUMENTS

| | | |
|---|---|---|
| CN | 110249586 A | 9/2019 |
| GB | 2564655 A | 1/2019 |
| JP | 2016115098 A | 6/2016 |
| JP | 2017-525601 A | 9/2017 |
| KR | 10-2019-0003491 A | 1/2019 |
| WO | 2018022755 A1 | 2/2018 |

OTHER PUBLICATIONS

Singapore Written Opinion for Singapore Application No. 11202203948Q, dated Aug. 24, 2023, 7 pages.
Japanese Notice of Reasons for Rejection for Japanese Application No. 2022-523900, mailed Aug. 8, 2023 with translation, 18 pages.
Mavadiya, M., "The Brand Psychology of the Metal Card", Aug. 18, 2019, 4 pages, retrieved from the Internet: https://www.forbes.com/sites/madhvimavadiya/2019/08/18/the-brandpsychology-of-the-metal-card/?sh=17d54fa46f2d.
Australian Examination Report for Australian Application No. 2020371649, dated Feb. 9, 2023, 4 pages.
International Search Report and Written Opinion for International Application No. PCT/US2020/056814, dated Feb. 8, 2021, 12 pages.
Koppelhuber et al., "Thin-film camera using luminescent connectors and an optical Soller collimater", Optics Express, vol. 25, No. 16, Aug. 2017, pp. 18526-18536.
Office Action issued Feb. 29, 2024, by the Canadian Intellectual Property Office in corresponding Canadian Patent Application No. 3,150,856. (6 pages).
Office Action issued Aug. 14, 2024, by the Republic of Colombia Superintendency of Industry and Commerce in corresponding Colombian Patent Application No. NC2022/0005305 and an English machine translation of the Office Action. (39 pages).
Examination Report and Search Report issued Nov. 25, 2024, by the United Arab Emirates Patent Office in corresponding United Arab Emirates Patent Application No. P6000712/2022. (10 pages).
Office Action (Request for the Submission of an Opinion) issued Mar. 11, 2025, by the Korean Intellectual Property Office in corresponding Korean Patent Application No. 10-2022-7016780 and an English translation of the Office Action. (23 pages).
Office Action (Notification of the First Office Action) issued May 21, 2025, by the China National Intellectual Property Administration in corresponding Chinese Patent Application No. 202080074516.4 and an English translation of the Office Action. (26 pages).
Office Action (Notification of the Second Office Action) issued Sep. 30, 2025, by the China National Intellectual Property Administration in corresponding Chinese Patent Application No. 202080074516.4 and an English translation of the Office Action. (30 pages).

* cited by examiner

METAL CARD WITH BIOMETRIC FEATURES

CROSS-REFERENCE TO RELATED APPLICATION

This application is a U.S. National Phase Patent Application of PCT Patent Application No. PCT/US2020/056814, filed Oct. 22, 2020, which is related to, and claims priority to the U.S. Provisional Application No. 62/925,926, filed Oct. 25, 2019, entitled METAL CARD WITH BIOMETRIC FEATURES, and the contents of each of which are incorporated herein by reference in their entireties for all purposes.

BACKGROUND OF THE INVENTION

Biometric sensors such as fingerprint detection devices are becoming ubiquitous in the field of security, including in connection with payment devices, such as mobile phones and transaction cards. For example, standard plastic credit cards with biometric sensors have been documented in a number of patent applications, including but not limited to U.S. Published Patent Application No. US20090145972A1 and US20180357457A1, both of which are incorporated herein by reference in their entireties. Consumers increasingly have an interest in using premium transactions cards, such those made of metal, ceramic, or a combination thereof, which poses additional considerations for providing biometric features.

SUMMARY OF THE INVENTION

One aspect of the invention comprises a metal transaction card, the metal transaction card comprising at least one metal layer and an inlay layer comprising a biometric sensor and one or more payment interface components configured to interface with a card reader, a secure element configured to exchange information with the card reader pursuant to processing a financial transaction, and at least one logic component connected to the biometric sensor. The logic component is configured to compare information detected by the biometric sensor to stored information and to enable processing of the financial transaction only upon a detected match between the detected and stored information. The card may further comprise at least one non-metal layer disposed between a first surface of the inlay layer and the metal layer and/or least one other layer assembled on a second surface of the inlay layer. The one or more payment interface components may comprise a set of physical contacts configured to interface with a card reader and accessible from a surface of the card. The one or more payment interface components may comprise one or more antennae configured for contactless communication with a card reader, such as via short-range wireless interconnection, such as by using Bluetooth® or NFC technology.

The one or more payment interface components may comprise a dual interface chip comprising a set of physical contacts configured to interface with a card reader and accessible from a surface of the card, one or more antennae configured for contactless communication with a card reader, and the secure element in a single integrated payment module. The logic component may further comprise the secure element connected to the set of physical contacts. The logic component may comprise the secure element, a microprocessor configured to compare information detected by the biometric sensor to stored information, computer memory for storing the stored information, and one or more antennae configured for contactless communication with a card reader in a single integrated secure processing module.

The transaction card may further comprise at least one opening in the metal layer, in which case the one or more payment interface components configured to interface with a card reader may comprise contacts accessible through the opening and/or the biometric sensor may be accessible through the opening.

The biometric sensor may be a fingerprint sensor, an image capture device and/or configured to detect a change in reflected radiation corresponding to biometric user information, such as an ultrasonic fingerprint sensor. In some embodiments, the biometric sensor may not be visible from an outer surface of the card, in which case visible indicia on an outer surface of the card may be aligned with the biometric sensor to signify a lateral location of the sensor relative to a periphery of the card.

Another aspect of the invention is a method for making a transaction card as described herein, the method comprising the steps of providing the metal layer, providing an inlay layer, and assembling the card with the biometric sensor and the one or more payment interface components in communication with the inlay and configured to obtain transaction information and biometric information originating from a location on or above the metal layer. The method may comprise providing at least one non-metal layer, at least one other layer, and disposing the non-metal layer between a first surface of the inlay layer and the metal layer and disposing the other layer on a second surface of the inlay layer. The step of assembling the card may comprise a hot lamination step or a cold lamination step.

The method may further comprise creating one or more openings in the metal layer. In embodiment in which the one or more payment interface components comprises a set of physical contacts configured to interface with a card reader and accessible from a surface of a finished card, the opening in the metal layer may be aligned with the set of physical contacts. In such embodiments, at least one non-conductive adhesive layer may be in contact with an underside of the metal layer, and the non-conductive adhesive may fill a peripheral gap between the opening in the metal layer and the one or more payment interface components, including the set of physical contacts, in a finished card. The non-conductive adhesive is thus operable to isolate the one or more payment interface components from the metal layer electrically, magnetically, or a combination thereof.

In other embodiments, the opening in the metal layer is aligned with the biometric sensor. In such embodiments, a non-conductive adhesive layer may be in contact with an underside of the metal may and may fill a peripheral gap between the opening in the metal layer and the biometric sensor in a finished card, the non-conductive adhesive operable to isolate the biometric sensor from the metal layer electrically, magnetically, or a combination thereof.

In embodiments with both an opening in the metal layer for the biometric sensor and for the one or more payment interface components, non-conductive adhesive may fill a first peripheral gap between a first opening in the metal layer and the one or more payment interface components and a second peripheral gap between a second opening in the metal layer and the biometric sensor in a finished card.

DETAILED DESCRIPTION OF THE INVENTION

Figure 1:
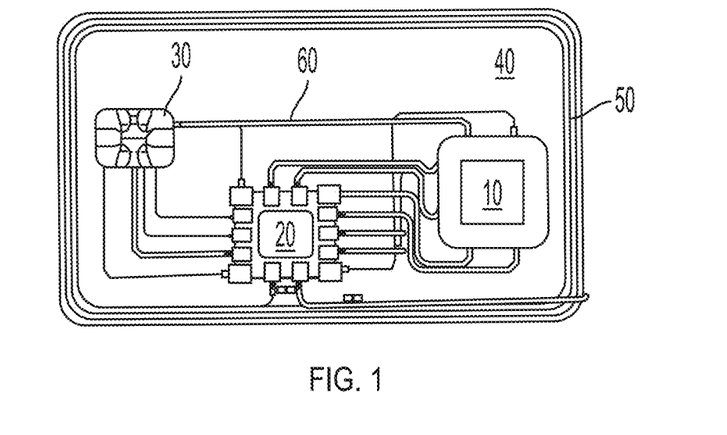
FIG. 1 depicts a portion of an exemplary printed circuit board (PCB) containing an inlay for use with a biometric card, shown from a front side of the PCB that would face a front of a finished card.
Figure 2A:
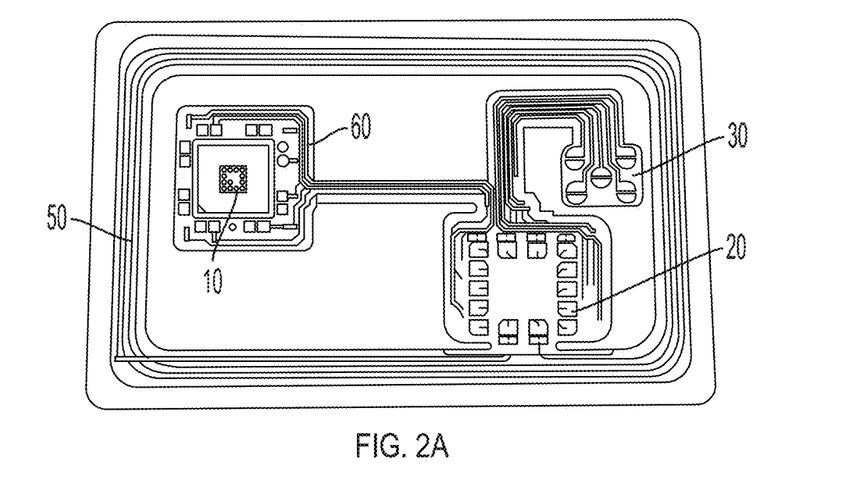
FIG. 2A depicts an exemplary inlay for use in a biometric card shown from a back side that would face a back side of a finished card.

As depicted in FIGS. 1 and 2A, an exemplary biometric circuit 10 for use in a transaction card may comprise a biometric sensor 10, a logic circuit 20, and a payment interface component 30. The circuit is embedded on a substrate 40, which substrate may further include an antenna 50 and a plurality of traces 60 connecting the various components. Biometric sensor 10 may comprise, for example, a fingerprint sensor configured to detect a fingerprint on any finger or thumb of a human user. Exemplary fingerprint biometric sensors and related technology are well known in the art, including but not limited to sensors for detecting the ridges and valleys in the fingerprint based upon temperature, optical images, capacitance, electrical resistance, differential pressure, acoustic methods, and ultrasonic sensors, without limitation. The biometric sensor is not limited to a fingerprint sensor, and may use any type of sensor known for detecting a unique biological signature of a user of the card. As a non-limiting example, the biometric system may comprise a camera or other image capture device for capturing retinal or facial information of a user. For example, thin film cameras having a thickness of less than 1 mm have been described in Alexander Koppelhuber and Oliver Bimber, "Thin-film camera using luminescent concentrators and an optical Söller collimator," *Opt. Express*25, 18526-18536 (2017), the full disclosure of which is incorporated herein by reference.

Payment interface component 30 may comprise a set of contacts configured for physical interaction with a card reader, a chip for inductive coupling with a card reader, a dual interface chip configured for both physical and inductive coupling, or a combination of all or fewer than all of the foregoing. The term "card reader" as used herein refers to any device capable of reading information from the card, which may include a traditional point of sale terminal, a mobile device, or any hardware known in the art for interfacing with a transaction card, such as devices configured for attachment to mobile devices. Contactless communication may be by any wireless communication technology known in the art, including but not limited to short-range wireless interconnection, such as via Bluetooth® technology. The biometric sensor and payment interface chip are connected to logic circuit 20, which is configured to detect whether the information sensed by the biometric sensor matches corresponding information associated with an authorized user of the card, and only if such a match is detected, to permit the card reader to transact. Power for powering the circuit may be obtained inductively from the card reader or through the module contacts during a contact transaction. A battery (not shown) in the card may also be present for circuit power requirements and may further be used to drive an active antenna in the card. Antenna 50 may be a booster antenna for amplifying the signal from the card reader.

In one exemplary embodiment, payment interface component 30 may be a "blank" faceplate configured for physical interaction with the corresponding contacts of the card reader, and logic circuit 20 may be a combination secure element (for driving the exchange of information pursuant to credit card processing) and a microcontroller unit comprising the matching circuitry as described above. In this foregoing exemplary embodiment, the logic circuit may, for example, comprise a secure processing module such as an SPM60 chip, available from NXP Semiconductors N.V. (The Netherlands). In another embodiment, the payment interface component 30 may include all of the circuitry and contacts and/or coupling hardware necessary for serving as a secure payment module, and logic circuit 20 may comprise only the microcontroller unit comprising the matching circuitry for determining if the biometric sensor has detected a "match" that is a prerequisite for permitting operation of the secure payment module.

Figures 3, 5:
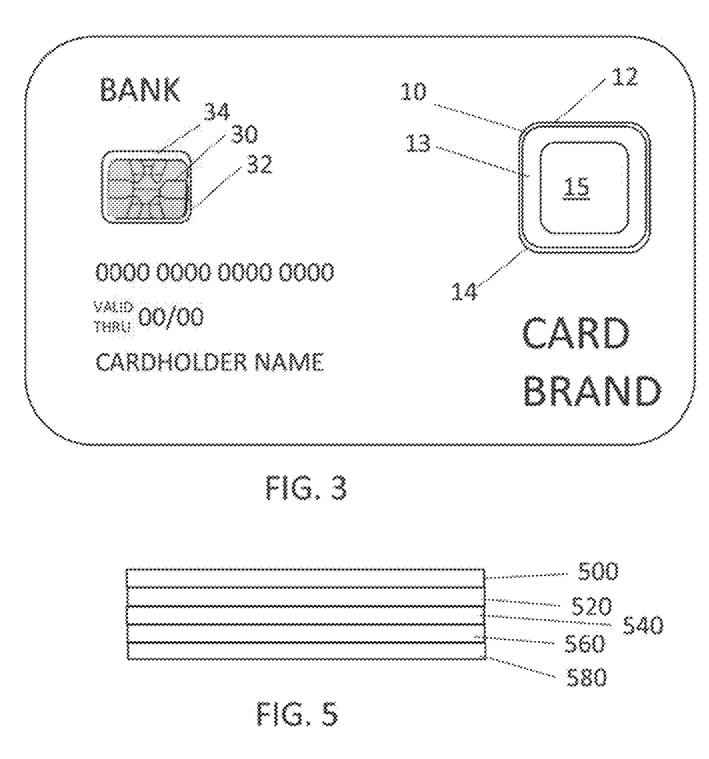
FIG. 3 depicts a finished card with a biometric sensor window visible from the front of the card.
FIG. 5 depicts a cross sectional view of an exemplary card assembly.

As depicted in FIG. 5, a metal card may comprise at least one metal layer, such as for example, one or both of outer layers 500 and 580. In some instances, additional protective layers may be provided covering the metal layers, such as transparent layers. The inlays depicted in FIGS. 1 and 2A may be incorporated in a metal card as a middle layer 540, with one or more non-metal layers 520, 560 disposed between the inlay 540 and the metal layer(s) 500, 580. Such non-metal layers may be provided to provide isolation, such as electric and/or magnetic isolation, of components in the inlay from the metal. For example, in a metal DI card, layer 520 may be a ferrite layer and antenna 50 may be a booster antenna, wherein the ferrite shields the antenna from the metal layer(s) to permit contactless transactions. In another embodiment, layer 500 may be a metal layer, layer 540 may be a ferrite layer, layer 580 may be the inlay, and layers 520 and 560 may be adhesive layers. An additional layer (not shown) may be disposed beneath layer 580, such as a layer that includes a signature panel and a magnetic stripe. One or more holes may be cut in the ferrite, such as between the chip and the metal layer and/or between the biometric sensor and the metal layer, and the metal layer may have one or more non-metal plugs therein to insulate and support the chip, such as is shown and described in U.S. Pat. No. 9,290,366, incorporated herein by reference.

Figure 6:
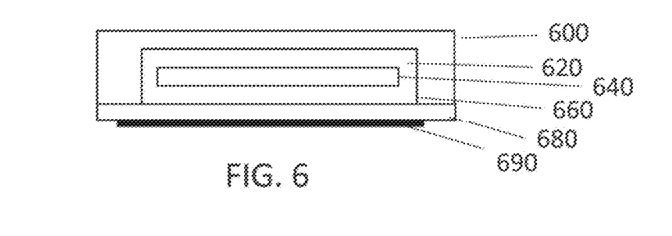
FIG. 6 depicts a cross sectional view of another exemplary card assembly, having an inlay embedded in a recess in the metal card body.
Figure 9:
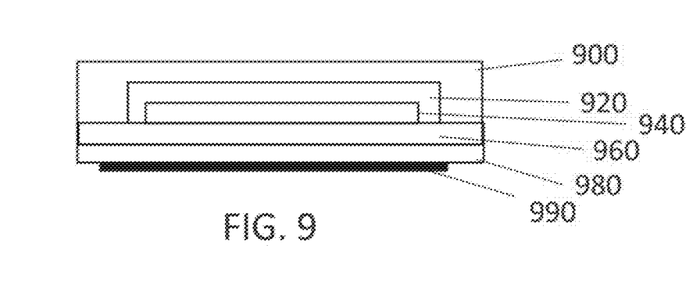
FIG. 9 depicts a cross sectional view of another exemplary card assembly, having one inlay embedded in a recess in the metal card body interfacing with another inlay having full-face dimensions.

In still other embodiments, such as that depicted in FIG. 6, the elements of the inlays as depicted in FIGS. 1 and 2A may be concentrated in an inlay 640 that has lateral dimensions smaller than the lateral dimensions of the card, and the metal layer 600 may have an opening 660 configured for accommodating the inlay. Inlay 640 may be encapsulated in the opening by non-conductive materials 620. One or more additional layers may be provided on a back surface of the card, such as layer 680, which may include a signature panel (not shown) and/or a magnetic stripe 690. Exemplary methods for encapsulating components within a metal card body are described in, for example, PCT Published Application No. WO2018/022755, U.S. Published Application Ser. No. 20190073578A1, and U.S. Pat. No. 10,406,734, all of which are incorporated herein by reference. In still another embodiment, depicted in FIG. 9, the various elements may be distributed among more than one inlay, such as a first inlay 960 that is coextensive with the card dimensions, and a second inlay 940 that is inset in a pocket in metal layer 900 and surrounded by encapsulant 920.

The metal layer may be an outermost layer, such as in some of the examples previously discussed herein, or in other embodiments, the metal layer may be an inner layer. For example, in the construction depicted in FIG. 5, layer 540 may be a metal layer, and layers 500 and 580 non-metal layers, with layers 520 and 560 adhesive layers. Additional layers may also be present. The inlay may be included in layer 500, 580, or in a layer located between one of outer layers 500, 580 and the middle layer. In one example, layer 520 or 560 may be a functional layer, with adhesive layers not depicted in FIG. 5 (but present between each set of adjacent functional layers). In other embodiments, such as the configuration depicted in FIG. 6, metal layer 600 may be a middle layer, with layer 680 and another layer on top of layer 600 (not shown) providing non-metal layers on the outside surfaces of the card.

The construction of the inlays as referred to herein may be by any method known in the art. In some embodiments, one or more of the payment interface component 30, logic circuit 20 and/or biometric sensor 10 may be pre-bonded to the inlay before card assembly/lamination. In other embodiments, a semi-finished card with an embedded inlay as one of a plurality of layers may be milled from an outer surface down to contacts in the inlay, thereby creating openings in overlying layer(s) that permit component 30, circuit 20 and/or sensor 10 to be embedded in the inlay in the appropriate place. The embedded component(s) may be conductively attached to corresponding mounting features in the inlay through a conductive process such as ACF tape, flex bump, soldering, and the like. Thus, methods of making a completed card may include hot lamination process or cold lamination processes. In an exemplary cold lamination process, a complete inlay with all of the payment interface component 30, logic circuit 20 and/or biometric sensor 10 is adhesively bonded to other layers of the card to form a finished or semi-finished card. Such a "cold" lamination process may be conducted at room temperature and may include application of pressure and/or the use of adhesives that require removal of a release layer before assembly of the layers. In an exemplary hot lamination process, an inlay containing fewer than all of payment interface component 30, logic circuit 20 and/or biometric sensor 10 are laminated to other layers of the card under elevated temperature (e.g. typically between 150-200 degrees C.) sufficient to melt at least one layer of the card and may also include application of pressure, as is well known in the art.

The card may have an outer layer other than metal, such as wood, ceramic, leather, or the like, or may comprise one or more layers of metal such as anodized aluminum, with or without etched and/or filled patterns, such as is described in U.S. Published Patent Application No. US20150339564A1, incorporated herein by reference. In still other constructions, the card body may comprise monolithic ceramic, or a ceramic coating over metal, such as is described in U.S. Published Patent Application No. US20170316300A1, incorporated herein by reference. The metal layer may be patinated, such as is described in n U.S. Published Patent Application No. US20180207903A1, incorporated herein by reference. The metal layer may be a metal doped epoxy layer, such as is described in PCT Application Ser. No. PCT/US2019/050592, incorporated herein by reference.

Aspects of the card may be built with other features for maximizing operability of the card, such as providing one or more of the metal layers with a discontinuity that minimizes eddy currents and/or permits the metal layer to act as an antenna to help couple the payment chip to the card reader, as disclosed generally in U.S. Published Patent Application Ser. No. US20190236434A1, titled "DI Capacitive Embedded Metal Card," incorporated herein by reference. Other constructions in which at least a part of the metal layer acts as an antenna are described in U.S. Published Patent Application Ser. No. US20190197384A1, titled "Chip Card Body, Chip Card and Method for Producing a Chip Card Body," which is a also incorporated by reference. Such card constructions may be provided in addition to or instead of antenna 500, or antenna 500 may be part of the antenna structure that couples with or otherwise cooperates with any antenna function of the metal layer itself.

Fewer or more layers than those described with respect to FIG. 5 may be provided. One or more adhesive layers may be interposed between the layers described and depicted herein, such as a non-conductive adhesive layer in contact with an underside of the metal layer or vertical walls. In one embodiment, depicted in FIG. 7, openings 12, 32 in metal layer 700 may permit non-conductive adhesive from layer 720 to fill the peripheral gaps between the respective openings in the metal layer and the payment component and the biometric sensor, thereby isolating the payment component and sensor from the edges of the metal opening with non-conductive adhesive 14, 34. FIG. 3 also illustrates (in exaggerated form) the respective peripheral pockets of adhesive 14, 34. Similarly, a blind pocket 22 may be formed in the underside of metal layer 700 to receive the MCU 20, with insulative material 22 filling the pocket between any metal components (e.g. solder beads) on the MCU and the metal layer, to prevent shorting. Standard insulating components, such as UV cured components, may be used. Pockets and openings in the metal layer may be coated with non-conductive materials. In embodiments in which payment component 30 comprises a secure payment module, including DI functionality, the non-conductive adhesive may also provide magnetic isolation for full module.

Figure 7:
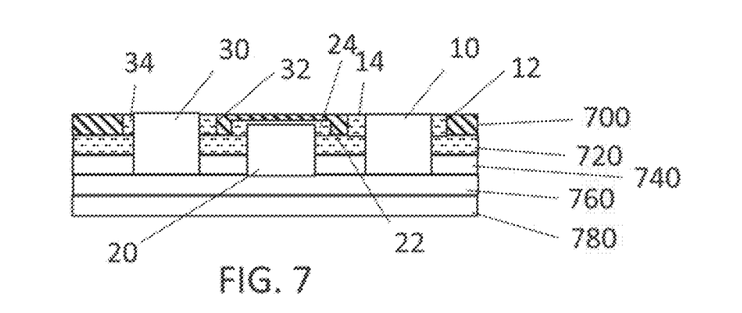
FIG. 7 depicts a cross sectional view of another exemplary card assembly, showing non-conductive fill surrounding the payment chip component and the biometric sensor in a card made by an exemplary process.
Figure 8:
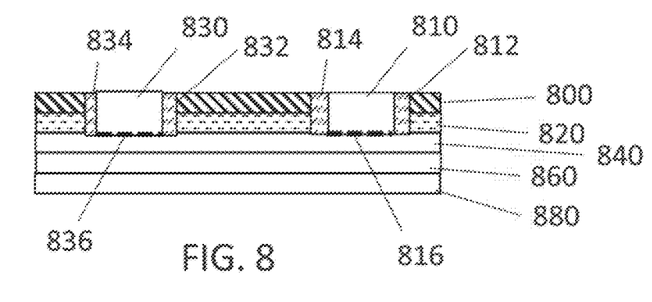
FIG. 8 depicts a depicts a cross sectional view of another exemplary card assembly, showing non-conductive fill surrounding the payment chip component and the biometric sensor in a card made by another exemplary process.

FIG. 7 shows an exemplary cross sectional structure consistent with an exemplary cold lamination manufacturing process, in which components 10 and 30 are bonded to the inlay 740 (layer 760 may comprise an additional adhesive layer for affixing one or more backing layers 780 to the card). FIG. 8 shows an exemplary structure consistent with an exemplary hot lamination manufacturing process, in which at least metal layer 800, adhesive layer 820, and inlay 840 are first assembled to another, then openings 832, 812 are milled through metal layer 800 and adhesive layer 820 to reach contacts 816, 834 on inlay 840 for respective connection with the sensor 810 and payment module 830. Non-conductive plugs 814, 834 may be disposed in the openings so created, for isolation, and then the plugs milled again with smaller openings to accommodate the respective sensor 810 and payment module 830, or each of the sensor 810 and payment module 830 may be provided with non-conductive plugs surrounding them for insertion in the milled openings. The resulting card thus may contain non-conductive peripheral areas surrounding each of the sensor 810 and payment module 830 that has a different composition than the composition of adhesive layer 820 (or the composition may be the same or similar). Layer 860 may comprise an additional adhesive layer for affixing one or more backing layers 880 to the card. Final card embodiments with fewer or more layers may be provided for any of the embodiments discussed herein. Additional layers may include, for example, a masking layer over the top layer, to hide the peripheral isolating plugs 34, 14, 834, 812 as described herein, and as described in more detail in U.S. Pat. No. 9,290,366, previously mentioned above and incorporated by reference in its entirety.

Figure 10:
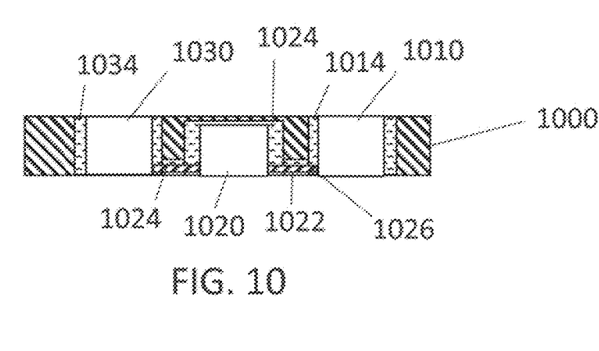
FIG. 10 depicts a cross sectional view of another exemplary card assembly, having no inlay, and wherein electric components are recessed directly into openings in the metal body and connected to one another via conductive traces inset into insulated grooves in the metal layer.

FIG. 10 illustrates a cross sectional structure of an embodiment in which the various electronic components, including payment module 1010, MCU 1020, and biometric sensor 1030 are inserted within the metal layer 1000 directly. For example, openings filled with non-conductive materials 1014, 1024, 1034 may be created for housing components 1010, 1020, 1030, respectively, in which the non-conductive materials may comprise an adhesive that also holds the respective components in place. One or more channels or grooves 1024 may be created between the payment module 1010 and the MCU 1020 and between the MCU and the biometric sensor 1030, into which electrical traces 1022 may be formed to connect the relevant portions of each component to one another. The electrical connections may be created by any means known in the art, such as printed with conductive ink, and may be further covered with additional non-conductive fill after creation. In other embodiments, a non-metal, non-conductive (e.g. plastic) layer may be formed beneath the metal layer to cover the back of the card and fill any open grooves with non-conductive fill. One or more additional functional or aesthetic layers may also be provided, as are well known in the art.

Figure 11A:
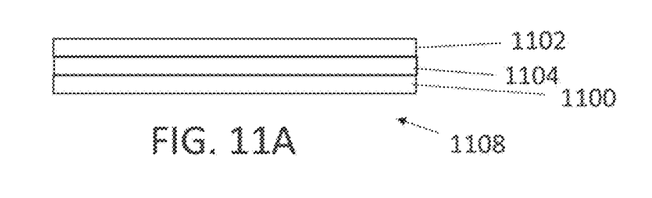
FIGS. 11A-D depict cross sectional views of another exemplary card assembly in various steps in an exemplary assembly process.
Figure 11B:
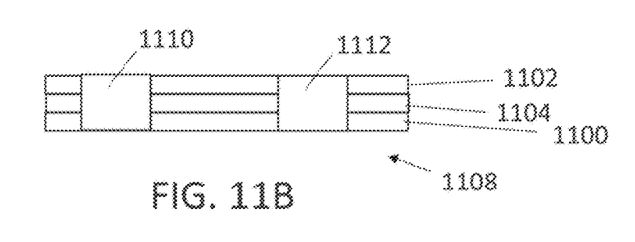
Figure 11C:
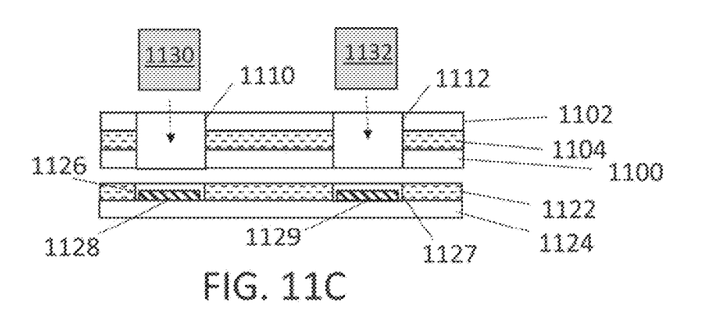
Figure 11D:
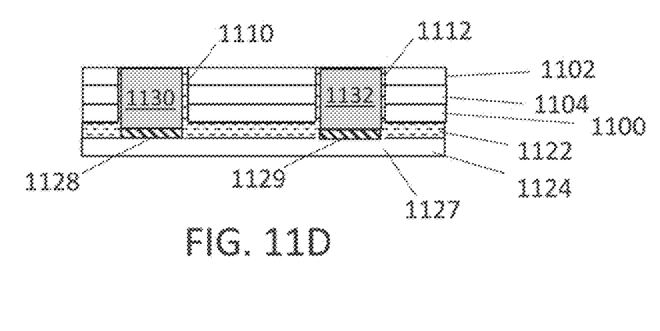

Another exemplary process for making a card is depicted in FIGS. 11A-11D. The process comprises first attaching (such as via hot or cold lamination) a radio frequency (RF) shielding layer (e.g. ferrite) 1100 to a metal layer 1102 with adhesive 1104 to create an assembly 1108, as depicted in FIG. 11A. Then, as depicted in FIG. 11B, openings 1110, 1112 are milled in the assembly to receive the electronic components. Next, as depicted in FIG. 11C, inlay 1124 is aligned with an adhesive layer 1122, which may have holes 1126, 1127 that align with openings 1110, 1112 and corresponding contacts 1128, 1129 in inlay 1124 for receiving electronic components 1130, 1132 (e.g., payment module and biometric sensor, respectively). A first release layer (not shown) on the adhesive layer facing the inlay may be removed from the adhesive and the adhesive attached to the inlay, before the second adhesive layer is removed. The electronic components may be attached to the contacts before or after removal of the second adhesive layer. In other embodiments, the adhesive layer may be a melt-flowable layer having a melting point below a threshold temperature associated with the electronic components. Finally, as depicted in FIG. 11D, inlay 1124 is attached to the assembly 1108, and the adhesive from layer 1122 files gaps between the electronic components 1130, 1132 and the walls of the corresponding openings 1110, 1112. Although only electronic components 1130, 1132 are shown, fewer or more components may be attached in this manner to corresponding contacts in the inlay. The ferrite layer and adhesive layers may serve as sufficient insulation for an MCU in inlay 1124, or a blind pocket may be milled into the metal layer (such as in the configuration depicted in FIG. 7) prior to or after lamination of the ferrite layer to the metal layer. In the case of a blind pocket formed in the metal layer, the blind pocket may also be filled with adhesive from layer 1122 during the final lamination step. Additional layers may be added to either of the outer surfaces depicted in FIG. 11D, or intermediate any of the layers there depicted.

Figure 2B:
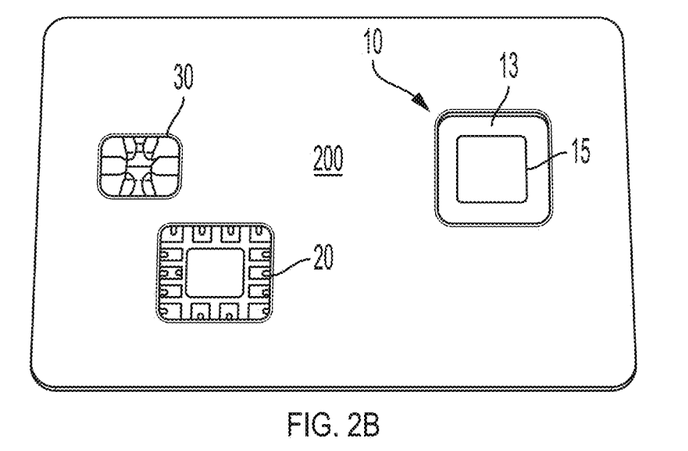
FIG. 2B depicts the exemplary inlay of FIG. 2A with a first additional layer covering the inlay.

FIG. 2B illustrates an exemplary layer 200 disposed over a front surface of the inlay depicted in FIG. 2A, with openings in layer 200 for sensor 10 and chips 20, and 30. While logic chip 20 is shown as visible through an opening, in other constructions, chip 20 may be hidden. In particular, chip 20 is preferably hidden with respect to a top layer of the card, as depicted in the finished cards of FIGS. 3 and 4.

Figure 4:
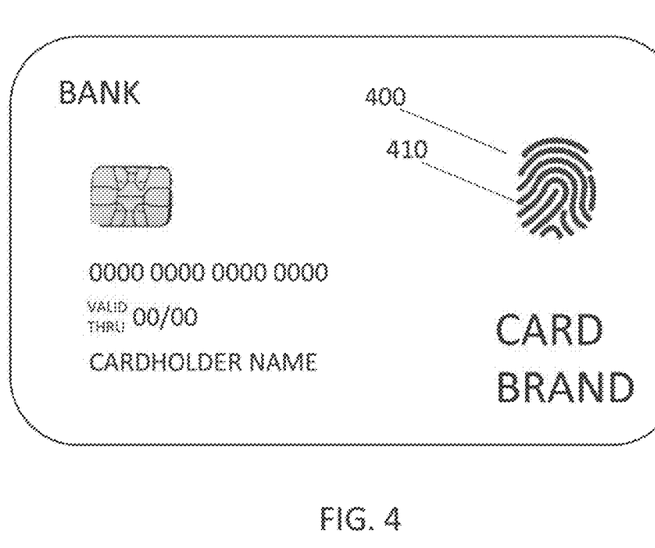
FIG. 4 depicts a finished card with a biometric sensor located beneath a top surface layer of the card, with a graphic indicator showing the location of the sensor.

While depicted in FIGS. 1, 2A, 2B and 3 as a fingerprint sensor in the nature of a voltage map sensor or other type of sensor that may be visible from a surface of the card (which may be the top or bottom surface), sensor 10 may not be visible from the outer layers of the card in other embodiments. For example, in FIG. 4, sensor 400 is depicted by dashed lines to indicate it is not visible from the top layer, where a graphic icon 410 may be show instead, to inform a user where to place the finger for identification. Sensor 400, may for example, be an ultrasonic fingerprint detector. As depicted in FIGS. 3 and 4, the top surface of the card may include a plurality of other indicia, such as the card number, the cardholder name, an expiration date, the bank or other card issuer name (e.g. Citi), and the card brand (e.g. Visa, Mastercard, American Express, etc.). Additional indicia may be provided on the front or back of the card, including a magnetic stripe, a printed code (such as a QR or barcode), a holographic element, and the like.

In embodiments in which a metal layer is the top surface of the card, the metal layer may have one or more openings therein, such as for the contacts 30 and/or biometric sensor 10. However, in a contactless-only card, the top metal surface may have no opening for the payment chip. In a card with a biometric detector capable of detection through metal, such as sensors based upon the detection of reflected radiation indicative of user information (e.g. a fingerprint detector based upon reflection of ultrasonic waves from a user's finger, or a surface plasmon resonance (SPR) detector based upon changes in properties of light reflected from beneath the card metal surface), the top metal surface may have no openings for the biometric sensor. The use of SPR, generally, as a sensor technology is described in Steiner, G. "Surface plasmon resonance imaging," *Analytical and Bioanalytical Chemistry*, (2004) 379: 328, incorporated herein by reference.

The biometric sensor depicted in FIGS. 2B and 3 includes a bezel 13 and an active biometric (e.g. fingerprint) scanning area 15. It should be understood that in some embodiments, a portion of the inlay (e.g. 740 in FIG. 7) may be grounded to the metal card body, such as via a contact or area of conductive adhesive, which may support use of biometric sensors without a bezel.

Although the invention is illustrated and described herein with reference to specific embodiments, the invention is not intended to be limited to the details shown. Rather, various modifications may be made in the details within the scope and range of equivalents of the claims and without departing from the invention.

In particular, although illustrated with certain configurations comprising certain layers, it should be understood that any of the embodiments depicted may contain additional aesthetic or functional layers, of any materials of construction, and additional functional or aesthetic components, including electronic components, magnetic stripes, barcodes, QR codes, or other types of 2D codes, personal information, card numbers, printed features, and the like, as are well known in the art, without limitation, and in any combination.

What is claimed:

1. A metal transaction card comprising:
    at least one metal layer;
    a biometric sensor;
    one or more payment interface components configured to interface with a card reader;
    a secure element configured to exchange information with the card reader pursuant to processing a financial transaction;
    at least one logic component connected to the biometric sensor and configured to compare information detected by the biometric sensor to stored information and to enable processing of the financial transaction only upon a detected match between the detected and stored information;
    visible indicia on a front outer surface of the card aligned with the biometric sensor to signify a lateral location of the sensor relative to a periphery of the card, such that the biometric sensor is not visible from the front outer surface of the card; and
    wherein at least a portion of the at least one metal layer or a further layer overlies the biometric sensor.

2. The metal transaction card of claim 1, wherein one or more the biometric sensor, the one or more payment interface components, the secure element, and the at least one logic component are disposed on an inlay.

3. The metal transaction card of claim 2, further comprising at least one non-metal layer disposed between a first surface of the inlay layer and the metal layer.

4. The metal transaction card of claim 2, further comprising at least one other layer assembled on a second surface of the inlay layer.

5. The metal transaction card of claim 2, wherein the biometric sensor, the one or more payment interface components, the secure element, and the at least one logic component are distributed among more than one inlay with one or more conductive elements conductively connecting at least one to another of the biometric sensor, the one or more payment interface components, the secure element, and the at least one logic component, wherein at least one of the biometric sensor, the one or more payment interface components, the secure element, the at least one logic component, and the one or more conductive elements comprise a printed circuit board (PCB).

6. The metal transaction card of claim 2, wherein the inlay has lateral dimensions smaller than lateral dimensions of the card.

7. The metal transaction card of claim 1, wherein the one or more payment interface components comprises a set of physical contacts configured to interface with a card reader and accessible from a surface of the card.

8. The metal transaction card of claim 7, wherein the at least one logic component further comprises the secure element connected to the set of physical contacts.

9. The metal transaction card of claim 8, wherein the at least one logic component comprises the secure element, a microprocessor configured to compare information detected by the biometric sensor to stored information, computer memory for storing the stored information, and one or more antennae configured for contactless communication with a card reader in a single integrated secure processing module.

10. The metal transaction card of claim 1, wherein the one or more payment interface components comprises one or more antennae configured for contactless communication with a card reader.

11. The metal transaction card of claim 1, wherein the one or more antennae is configured for contactless communication with a card reader in the nature of short-range wireless interconnection.

12. The metal transaction card of claim 1, wherein the one or more payment interface components comprises a dual interface chip comprising a set of physical contacts configured to interface with a card reader and accessible from a surface of the card, one or more antennae configured for contactless communication with a card reader, and the secure element in a single integrated payment module.

13. The metal transaction card of claim 1, further comprising at least one opening in the metal layer.

14. The metal transaction card of claim 13, wherein the one or more payment interface components configured to interface with a card reader comprises contacts accessible through the at least one opening.

15. The metal transaction card of claim 13, wherein the biometric sensor is accessible through the at least one opening.

16. The metal transaction card of claim 1, wherein the biometric sensor is a fingerprint sensor.

17. The metal transaction card of claim 1, wherein the biometric sensor comprises an image capture device.

18. The metal transaction card of claim 1, wherein the biometric sensor is configured to detect a change in reflected radiation corresponding to biometric user information.

19. The metal transaction card of claim 18, wherein the biometric sensor is an ultrasonic fingerprint sensor.

20. The metal transaction card of claim 18, wherein the biometric sensor is partially or entirely not visible from an outer surface of the card.

21. A method for making a transaction card, the method comprising the steps of:
    (a) providing at least one metal layer;
    (b) providing at least one inlay layer comprising a biometric sensor, one or more payment interface components configured to interface with a card reader;
    a secure element configured to exchange information with the card reader pursuant to processing a financial transaction;
    at least one logic component connected to the biometric sensor and configured to compare information detected by the biometric sensor to stored information and to enable processing of the financial transaction only upon a detected match between the detected and stored information; and
    visible indicia on a front outer surface of the card aligned with the biometric sensor to signify a lateral location of the sensor relative to a periphery of the card, such that the biometric sensor is not visible from the front outer surface of the card;
    (c) assembling the card with the biometric sensor and the one or more payment interface components in communication with the inlay and configured to obtain transaction information and biometric information originating from a location on or above the metal layer; and
wherein at least a portion of the at least one metal layer or a further layer overlies the biometric sensor.

22. The method of claim 21, further comprising the steps of:
   (d) providing at least one non-metal layer;
   (e) providing at least one other layer;
   (f) disposing the at least one non-metal layer between a first surface of the at least one inlay layer and the at least one metal layer and disposing the at least one other layer on a second surface of the at least one inlay layer.

23. The method of claim 21, further comprising creating one or more openings in the metal layer.

24. The method of claim 23, wherein the one or more payment interface components comprises a set of physical contacts configured to interface with a card reader and accessible from a surface of a finished card, and creating at least one opening in the metal layer aligned with the set of physical contacts.

25. The method of claim 24, comprising at least one non-conductive adhesive layer in contact with an underside of the at least one metal layer, wherein the non-conductive adhesive fills a peripheral gap between the opening in the metal layer and the one or more payment interface components, including the set of physical contacts, in a finished card, said non-conductive adhesive operable to isolate the one or more payment interface components from the metal layer electrically, magnetically, or a combination thereof.

26. The method of claim 24, comprising creating at least one opening in the metal layer aligned with the biometric sensor.

27. The method of claim 26, comprising at least one non-conductive adhesive layer in contact with an underside of the at least one metal layer, wherein the non-conductive adhesive fills a first peripheral gap between a first opening in the metal layer and the one or more payment interface components, including the set of physical contacts, and a second peripheral gap between a second opening in the metal layer and the biometric sensor in a finished card, said non-conductive adhesive operable to isolate the one or more payment interface components and the biometric sensor from the metal layer electrically, magnetically, or a combination thereof.

28. The method of claim 23, comprising creating at least one opening in the metal layer aligned with the biometric sensor.

29. The method of claim 28, comprising at least one non-conductive adhesive layer in contact with an underside of the at least one metal layer, wherein the non-conductive adhesive fills a peripheral gap between the opening in the metal layer and the biometric sensor in a finished card, said non-conductive adhesive operable to isolate the biometric sensor from the metal layer electrically, magnetically, or a combination thereof.

30. The method of claim 21, wherein the step of assembling the card comprises a hot lamination step.

31. The method of claim 21, wherein the step of assembling the card comprises a cold lamination step.

32. The method of claim 21, wherein step (b) further comprises distributing the biometric sensor, the one or more payment interface components, the secure element, and the at least one logic component among the at least one inlay layer, with one or more conductive elements conductively connecting at least one to another of the biometric sensor, the one or more payment interface components, the secure element, and the at least one logic component, and wherein at least one of the biometric sensor, the one or more payment interface components, the secure element, the at least one logic component, and the one or more conductive elements comprise a printed circuit board (PCB).

33. A method for making a transaction card, the method comprising the steps of:
   (a) providing at least one metal layer;
   (b) creating a plurality of openings in the metal layer, and a plurality of grooves in the metal layer connecting respective openings;
   (c) inserting in respective openings of the plurality of openings each of a plurality of electronic components, the plurality of electronic components comprising:
      a biometric sensor configured to obtain biometric information originating from a location on or above the metal layer, such that the biometric sensor is not visible from a front outer surface of the transaction card,
      one or more payment interface components configured to interface with a card reader and configured to obtain transaction information originating from a location on or above the metal layer,
      a secure element configured to exchange information with the card reader pursuant to processing a financial transaction, and
      at least one logic component configured to communicate with the biometric sensor and to compare information detected by the biometric sensor to stored information and to enable processing of the financial transaction only upon a detected match between the detected and stored information;
   (d) creating electrical connections among predetermined inputs and outputs of the electronic components, the electrical connections comprising metallic traces disposed in the plurality of grooves;
   (e) providing visible indicia on the front outer surface of the card, the visible indicia being aligned with the biometric sensor to signify a lateral location of the sensor relative to a periphery of the card; and
   wherein at least a portion of the at least one metal layer or a further layer overlies the biometric sensor.

34. A metal transaction card comprising:
   at least one metal layer;
   a biometric sensor;
   one or more payment interface components configured to interface with a card reader;
   a secure element configured to exchange information with the card reader pursuant to processing a financial transaction;
   at least one logic component connected to the biometric sensor and configured to compare information detected by the biometric sensor to stored information and to enable processing of the financial transaction only upon a detected match between the detected and stored information;
   visible indicia on a front outer surface of the card aligned with the biometric sensor to signify a lateral location of the sensor relative to a periphery of the card, such that the biometric sensor is not visible from the front outer surface of the card; and
   wherein at least a portion of the at least one metal layer or a further layer overlies the biometric sensor,
   wherein one or more the biometric sensor, the one or more payment interface components, the secure element, and the at least one logic component are disposed on an inlay, wherein the inlay has lateral dimensions smaller than lateral dimensions of the card, wherein the inlay comprises a first inlay layer coextensive with the card and a second inlay layer received in a pocket formed in the at least one metal layer and surrounded by an encapsulant.

* * * * *